(12) United States Patent
Essenburg (10) Patent No.: US 9,376,092 B2
(45) Date of Patent: Jun. 28, 2016

(54) CAR WASH SYSTEM

(75) Inventor: Ryan J. Essenburg, Holland, MI (US)

(73) Assignee: VQ, Inc., Holland, MI (US)

( * ) Notice: Subject to any disclaimer, the term of this patent is extended or adjusted under 35 U.S.C. 154(b) by 1116 days.

(21) Appl. No.: 13/401,068

(22) Filed: Feb. 21, 2012

(65) Prior Publication Data

US 2012/0216835 A1 Aug. 30, 2012

Related U.S. Application Data

(60) Provisional application No. 61/446,330, filed on Feb. 24, 2011.

(51) Int. Cl.
*B08B 3/02* (2006.01)
*B60S 3/04* (2006.01)

(52) U.S. Cl.
CPC ... *B60S 3/044* (2013.01); *B60S 3/04* (2013.01)

(58) Field of Classification Search
CPC .................................. B60S 3/04; B60S 3/044
USPC ......................................................... 134/123
See application file for complete search history.

(56) References Cited

U.S. PATENT DOCUMENTS

| 3,229,703 | A | * | 1/1966 | Thompson | B60S 3/044 134/100.1 |
| 3,299,901 | A | * | 1/1967 | Axe | B60S 3/04 134/123 |
| 4,946,513 | A | | 8/1990 | Del Prato et al. | |
| 4,988,042 | A | * | 1/1991 | Del Prato | B60S 3/04 134/172 |
| 5,653,392 | A | * | 8/1997 | Wells | B05B 1/3006 239/588 |

* cited by examiner

*Primary Examiner* — Douglas Lee
(74) *Attorney, Agent, or Firm* — Warner Norcross & Judd LLP (57) ABSTRACT

A automatic car washing apparatus is provided with a preparation station including a spray bar joined with an armature. The spray bar is manually moveable to selectively spray certain portions of a vehicle determined by the attendant. The armature provides forces to assist the user in manually manipulating the spray bar to prepare the vehicle to undergo subsequent and/or additional washing or cleaning procedures. A related method is also provided.

11 Claims, 11 Drawing Sheets

CAR WASH SYSTEM

BACKGROUND OF THE INVENTION

The present invention relates to the field of car wash equipment, and more particularly, to a car wash preparation station.

There are a variety of automatic car wash systems presently available. Typically, these systems include multiple, fixed high pressure spraying stations that are capable of cleaning the exterior surface of a vehicle with appropriate amounts of water under appropriate pressure and with cleaning chemicals as the vehicle passes by the spray stations.

Usually, certain areas of a vehicle's exterior can be significantly more dirty than others. For example, the front grill and the rear of the car, particularly near the rear fenders and back bumper, typically accumulate more dirt and grime than the top and sides of the car. Even with the most advanced car wash systems, those parts of the car sometimes might not become as clean as desired when passing through the systems.

To address this issue, most automated car wash systems are supplemented with a human attendant who manually scrubs or sprays off the dirtier areas of vehicles before the vehicle enters the automated car wash system. The preparation of the vehicle before it is actually washed in the automated portion of the system is time consuming for the attendant. This can be particularly problematic when there are multiple potential consumers at a car wash, and time is of the essence. Further, the spray apparatus may be cumbersome and difficult to handle for the attendants. For attendants that are of diminutive stature or lack strength, it can be an added burden.

Accordingly, there remains room for improvement with units or stations that prepare vehicles before they pass through an automated car wash system.

SUMMARY OF THE INVENTION

A car washing apparatus is provided with a preparation station including spray bar joined with an armature that provides forces to assist a user in manually manipulating the spray bar to apply a liquid to a vehicle when preparing the vehicle to undergo subsequent and/or additional washing and/or cleaning procedures.

In one embodiment, the armature can include a support member to which a retractor is joined. The retractor can include a cord that extends from the retractor and is joined with a first arm. The first arm can be pivotally joined with a second arm at a pivot or hinge. An elongated spray bar can be joined with the second arm, optionally in the middle of the spray bar. The spray bar can include nozzles that are adapted to spray liquid on a vehicle located on a pathway adjacent the armature.

In another embodiment, the retractor can exert a force on the first arm to pull the first arm toward the retractor. This force can be translated to the first arm and the second arm to selectively exert a force on the spray bar. The force exerted by the retractor can supplement and/or replace the force generated by a user to move the spray bar, thereby making it easier for the user to move the spray bar.

In still another embodiment, the retractor can be configured so that it selectively exerts the force when the user manually moves the spray bar toward and/or away from a vehicle located on a pathway adjacent the armature.

In yet another embodiment, the retractor can include a biasing element that urges the cord to retract toward the retractor so that, with the cord attached to the first arm, the retractor can produce a force that lifts the first arm, the second arm and the spray bar to a assist a user in manually lifting the spray bar against the force of gravity.

In even another embodiment, the spray bar can be joined with an end of the second arm distal from the first arm. Where these components are joined, a swivel joint can be provided so that the spray bar can be rotated around a swivel axis that is generally perpendicular to the pathway on which the vehicle moves.

In a further embodiment, the armature and spray bar can be positioned above the pathway on which the vehicle moves. The armature can be suspended substantially over a central region of the pathway. The spray bar can be joined with the armature at substantially only one location in the middle of the bar to reduce the weight and duplication of components of the armature and the spray bar.

In still a further embodiment, a hose can be joined with the armature and/or the spray bar. The hose can provide liquid that is sprayed through a plurality of nozzles located on the spray bar. The hose can be connected to the spray bar at a swivel fitting so that when the spray bar is optionally swiveled about the swivel axis, the hose does not kink and can continue to deliver liquid to the spray bar.

In yet a further embodiment, the retractor can include a stop joined with the cord so that the retractor, when retracting the second arm, does not retract the second arm to such an extent that it impacts the retractor.

In even a further embodiment, the armature can be extendable from a retracted position to an extended position. In the retracted position, the spray bar can be substantially level in a horizontal plane with a pivot axis about which the first arm pivots relative to a support member. In the extended mode, the armature can be configured so that the first arm and the second arm are both located in a vertical plane with the spray bar still being horizontal, but located proximal the pathway in which the vehicle travels.

In another, further embodiment, the armature can be constructed from a lightweight material, such as aluminum or composites, for example polymeric or carbon fiber tubes or bars. With the weight of the armature reduced, the effort and force to move the armature, and thus the spray bar can be significantly reduced, for example, by or to 10-50 pounds of force.

In yet another, further embodiment, a method is provided including providing an armature and spray bar noted in any of the embodiments above; manually moving the spray bar toward the vehicle, spraying liquid on the vehicle from the spray bar; and manually moving the spray bar away from the vehicle, with the retractor exerting an upward force on the first arm, the upward force translated to the spray bar to provide physical assistance to a user as they move the spray bar relative to the vehicle. Optionally, the method can include swiveling the spray bar in a substantially horizontal plane about an axis of rotation above the pathway to redirect nozzles from the first spray direction to a second spray direction. This optional step can be useful in spraying a front portion of the vehicle with the spray bar and then flipping or rotating the bar about the axis of rotation to redirect the spray and spray the rear portion of the vehicle with the spray bar.

The preparation station including the armature and spray bar, when used with a car wash system, provides a simple and efficient construction that assists and attendant in manually manipulating the spray bar to prepare a vehicle for washing and/or cleaning. This construction can save time for the attendant so that an additional volume of cars can be quickly and efficiently prepped and washed. The construction also can enable diminutive or physically challenged attendants to operate the system. Where the armature is constructed from light weight materials, the attendant can easily overcome the inertia forces of the armature during movement, and therefore, fatigue can be reduced when operating the spray bar. Further, with less mass in the armature, the attendant can more easily get the spray bar in motion with a quick manual reaction.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

I. Overview

A current embodiment of the preparation station of a car wash system is shown in FIGS. 1-7 and generally designated 10. The preparation station 10 includes a support structure 12 to which a support member 14 is connected. An armature 20 including a first arm 30 and a second arm 40 can be joined with the support structure 12. To the armature, a spray bar 60 is further joined, and in particular, joined with the free second end 42 of the second arm 40. A retractor 50 can include a retractor cord 52 and be joined with the support member 14. The cord 52 can extend toward and can be joined with the first arm 30 of the armature 20. The retractor 50 can include an internal biasing element (not shown) that selectively exerts a force F to retract the cord 52 into the retractor 50, which in turn, exerts a force on the first arm 30, thereby pulling the first arm 30 toward the support member 14. In turn, this exertion of the force F by the retractor can provide physical assistance to an attendant manipulating a handle 62 of the spray bar 60 to thereby move the spray bar 60 in a desired manner at a desired rate toward or away from a vehicle 103 or the pathway 100.

II. Components

The construction of the preparation station 10 will now be described in more detail with reference to FIGS. 1-10. As noted above, the preparation station 10 can include a support structure 12 joined with a support member 14 to which the retractor 50 is joined. In general, the support structure 12 can be in the form of an arch that extends upwardly and over at least a portion of the pathway 100 on which the vehicle 103 travels toward a further automated car wash system 107. The preparation station 10 can be positioned adjacent an automated car wash station 107. The preparation station 10 can be configured to prewash, treat or otherwise prepare a vehicle traveling on a path 100 before it enters the automated car wash station 107. For example, the preparation station 10 can spray water, liquid cleaners and/or other chemicals on the car 103 before it enters the automated car wash station 107. Optionally, the car wash station 107 can include primary car wash equipment 109, which administers quantities of water, liquid cleaners and/or other chemicals to the car 103 during a primary washing operation. The car wash equipment can be automated and can include additional spraying apparatus, scrubbers, dryers and the like. Of course, although described in conjunction with an automated car wash station, the preparation station 10 can be used in conjunction with other types of stations in a car wash if desired.

The preparation station 10 can be configured so that it enables a spray bar 60 to be easily manipulated manually and moved toward and away from a vehicle 103 located on the pathway 100 by a human operator holding the spray bar 60 and physically moving it. Generally, the preparation station 10 can be configured so that the support structure 12 is positioned proximal the pathway 100, optionally extending horizontally across at least a portion of the pathway so that the spray bar 60 can be moved above the pathway 100 and adjacent the vehicle 103. As shown, the support structure 12 can be in the form of a partial arch. Of course, if desired, it can be in the form of a full arch. Further, although shown in the form of an a semicircular arch attached to a linear post, the arch can be of other geometric shapes, for example, it can be partially triangular, elliptical, square, octagonal, hexagonal or of other configurations. The support structure 12 can be made from solid or hollow tubing of a sufficient rigidity and strength to support the armature 20. The dimensions of the support structure 12 can also be such that it can hold the armature 20 above a variety of different sized vehicles ranging from cars, to light and heavy trucks or semis, depending on the particular car wash application.

Optionally, the support structure 12 can include one or more ancillary supports that extend from the ground up to the support structure 12. Such supports can be of a variety of geometric configurations and cross sections like those of the support structure 12. The ancillary supports can generally assist in holding the support structure 12 in an upright position. The ancillary supports can be on one side of the support structure 12 or on opposite sides of the support structure 12, that is, forward and/or rearward of the support structure 12, or elsewhere if desired.

The support structure 12 can further include a support member 14 which extends generally from the uppermost portion of the support structure 12. Of course, if desired, this support member 14 can extend from other portions of the support structure, for example, midway down the support structure or at an angle coming inward from the side of the support structure 12, generally extending outwardly over the pathway 100. As illustrated, the support member 14 can be at an angle of about 60° to about 45° from horizontal. The angle may be selected depending on the amount of forces that are generated by the retractor on the first arm 30. The support member 40 can be joined with the end 16 of the support structure 12. The support member 14 can be immovable relative to that end 16. The support member 14 can be of a variety of geometric configurations and cross sections similar to those of the support structure 12.

The support structure 12, support member 14 and any ancillary supports, as well as the arms 30, 40 and spray bar 60 can be constructed from a variety of materials, including stainless steel, other metals or alloys, polymers, composites and the like, and can be of virtually any geometric configuration or cross section. Generally, the materials can be chemical and corrosion resistant to provide longevity of the station 10. Further, the materials can be selected to be lightweight. For example, where the armature is constructed at least in part with carbon fiber materials, it can move with less inertia, and therefore can be manipulated by attendants with less physical, manual force, and for longer periods of time without significant fatigue.

Although not shown, the support member 14 can alternatively be connected to a roof or other building structure instead of the support structure. In such an embodiment, the support member 14 can simply extend downwardly from the roof or other building structure, with the armature 20 pivotally joined with the support member 14. In other embodiments, the support member 14 can be completely absent from the preparation station 10, along with the support structure 12. In such a configuration, the retractor 50 can be attached to the roof or a floor of another level of a building, and the first arm 30 can be pivotally attached to the roof or other level of a building to provide the same effect as the preparation station shown in FIGS. 1-10.

Figure 1:
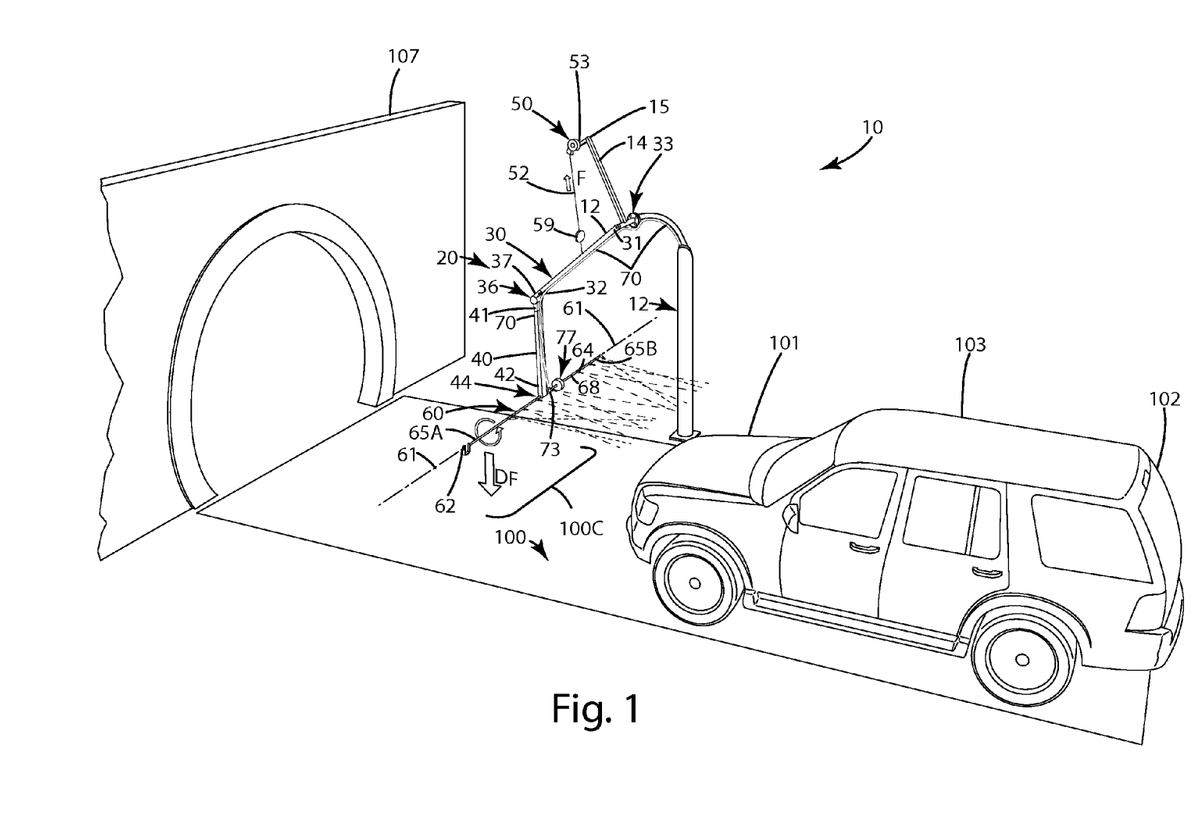
FIG. 1 is a perspective view of a current embodiment of the car wash preparation station.
Figure 2:
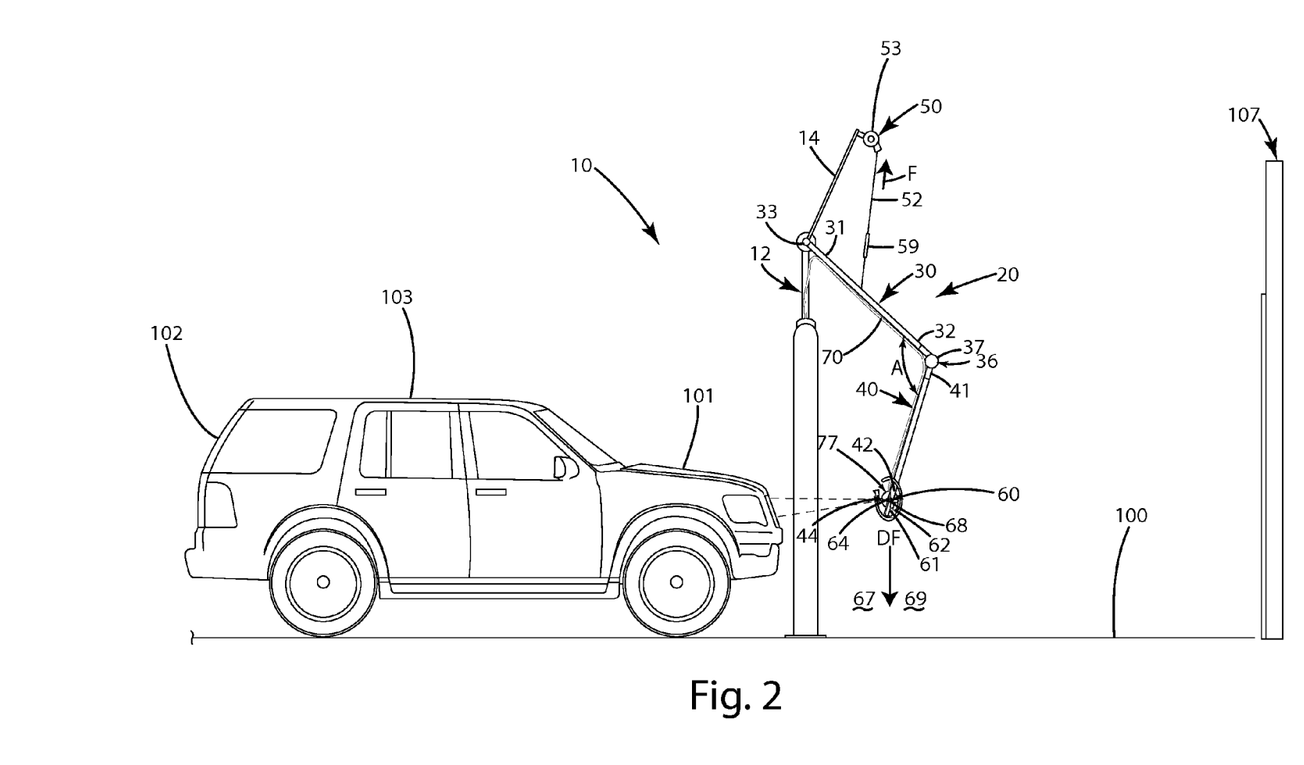
FIG. 2 is a side view of the preparation station with an armature in an extended mode so that a spray bar can spray in a first direction toward a forward portion of a vehicle.
Figure 3:
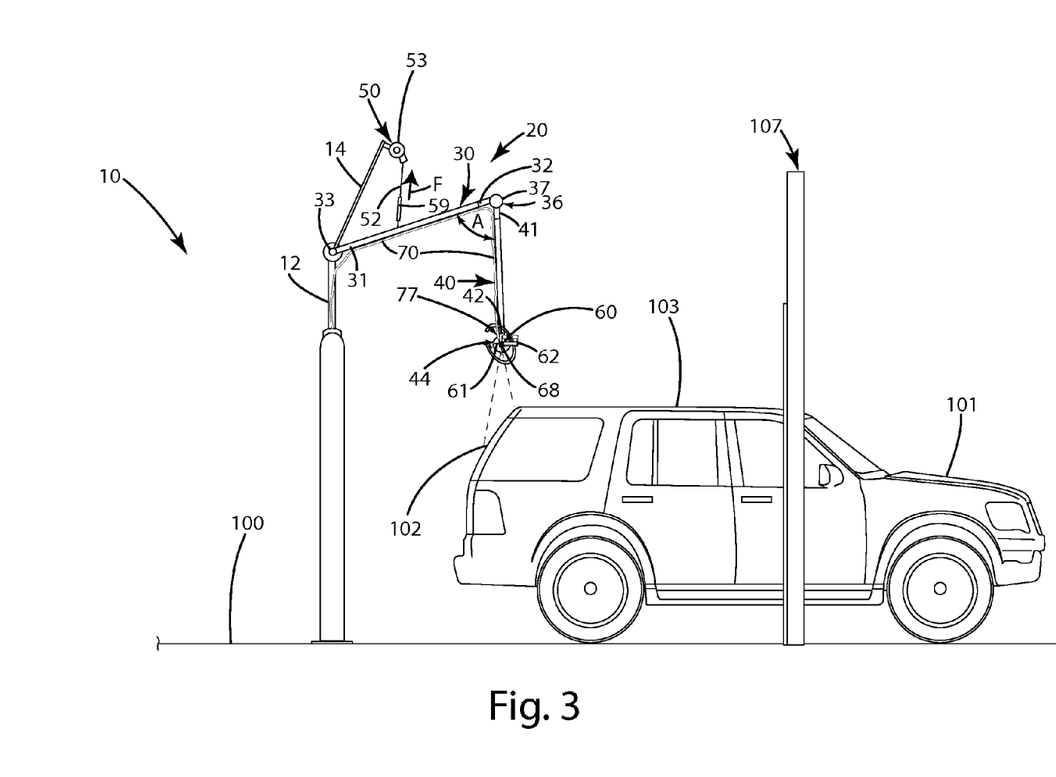
FIG. 3 is a side view of the preparation station with the armature in a partially retracted mode with the spray bar being swiveled about an axis of rotation so that the spray bar can spray in a second direction toward a middle portion of the vehicle.
Figure 4:
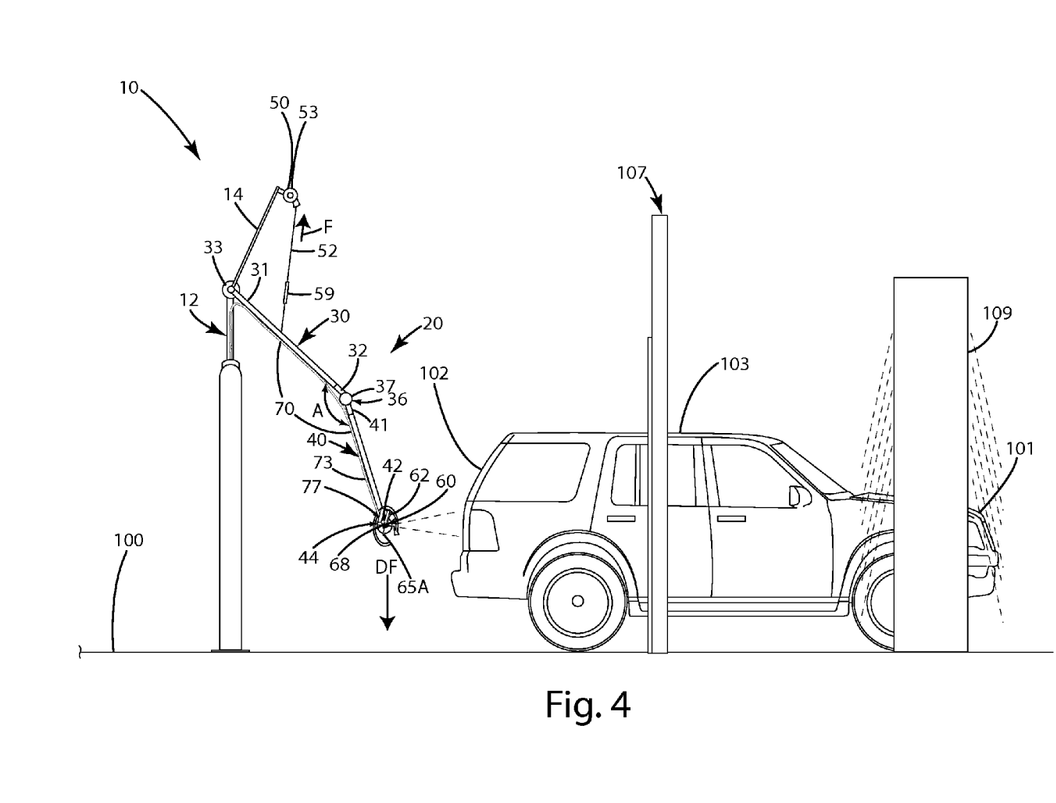
FIG. 4 is a side view of the preparation station with the armature in another extended mode with the spray bar being swiveled about an axis of rotation so that the spray bar can spray in a third direction toward a rear portion of the vehicle.
Figure 5:
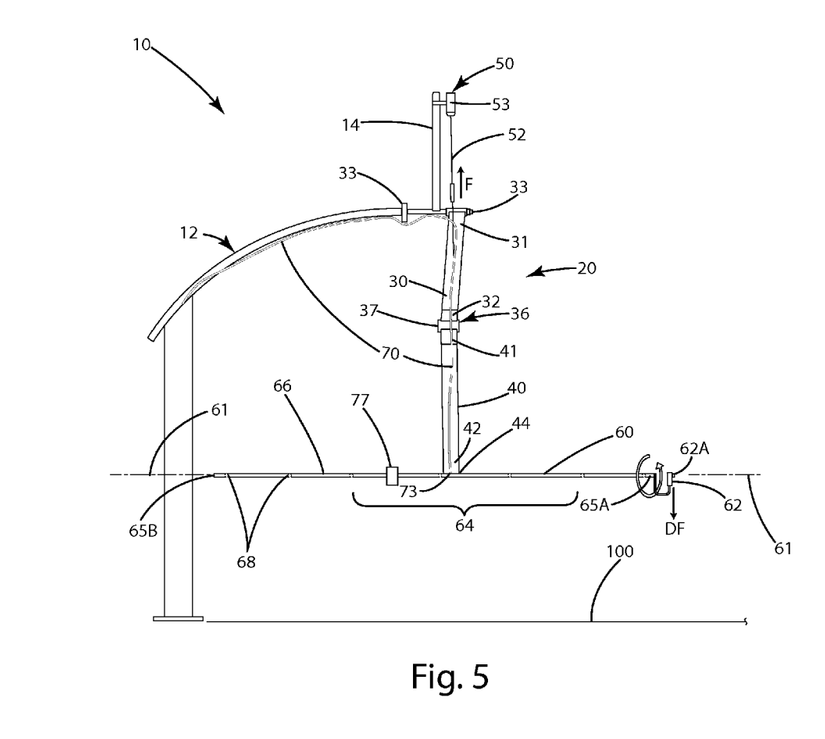
FIG. 5 is a rear view of the spray bar in an extended mode.
Figure 6:
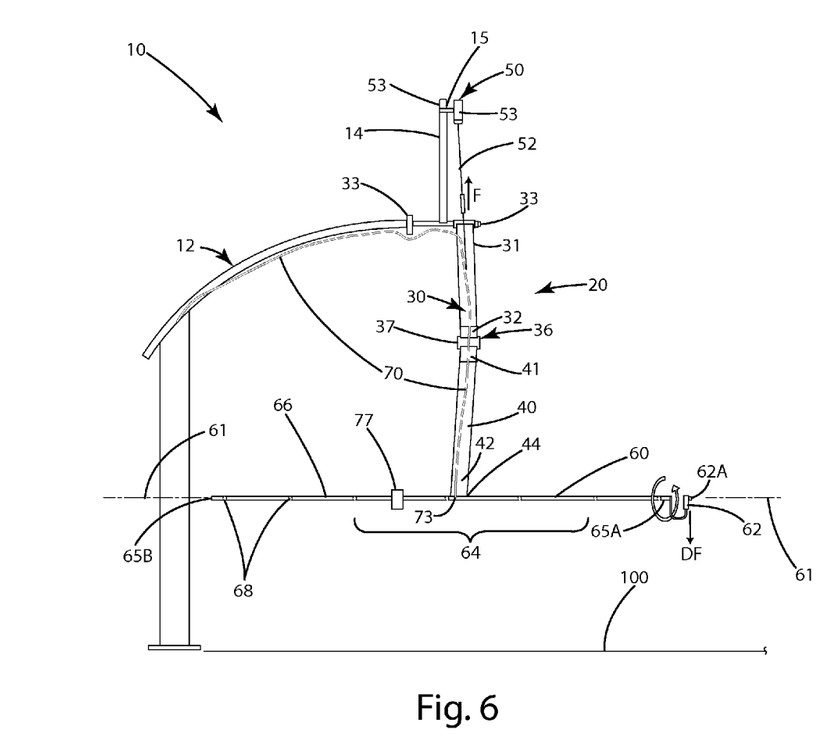
FIG. 6 is a front view of the spray bar in an extended mode.
Figure 7:
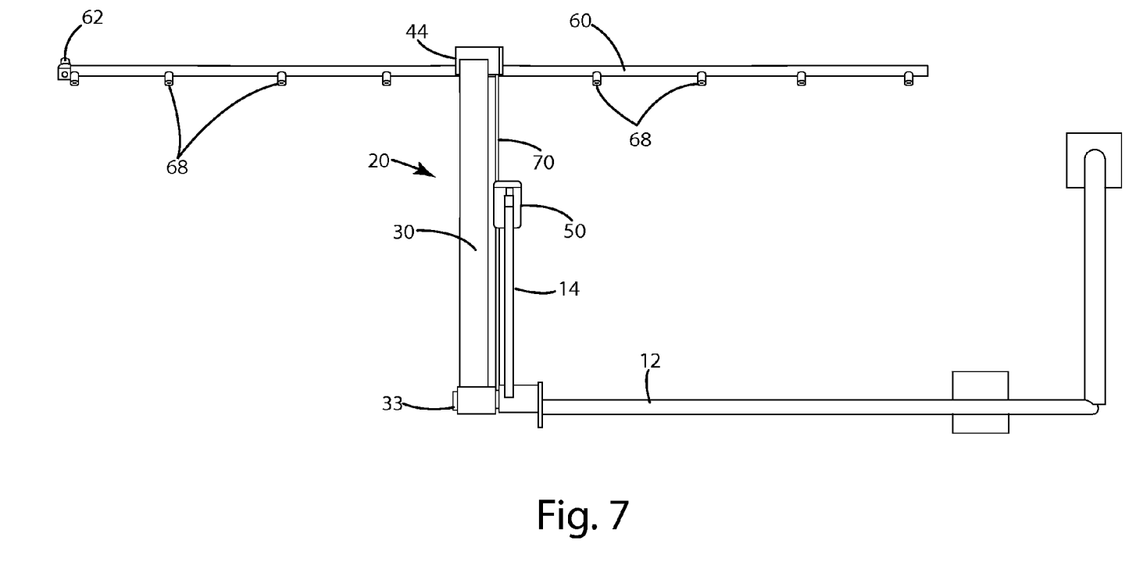
FIG. 7 is a top view of the preparation unit.
Figure 8:
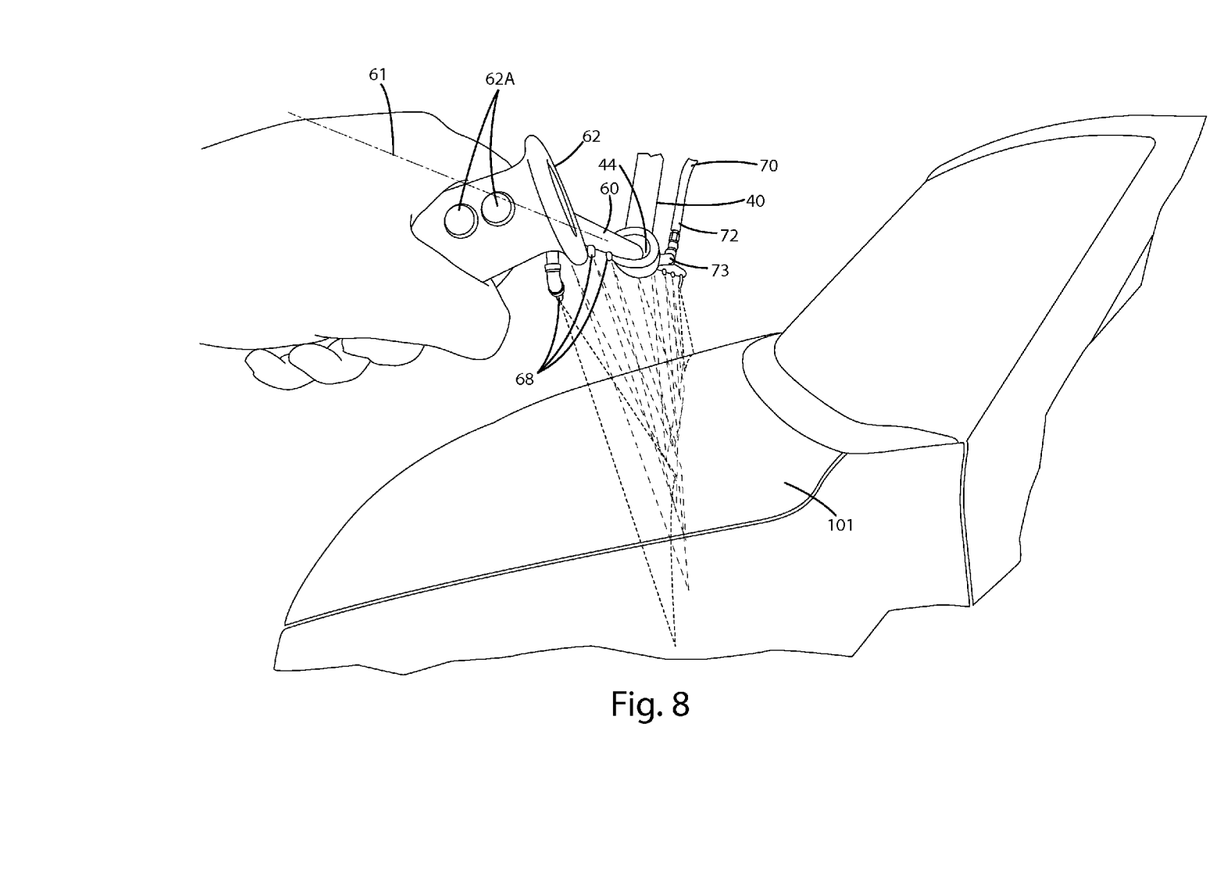
FIG. 8 is a close up perspective view of the preparation station with the spray bar in an extended mode, illustrating swiveling of the spray bar about the axis of rotation and spraying in a first direction toward a front portion of the vehicle.

Returning to the illustrated preparation station 10 of the current embodiment, a retractor 50 can be attached to the support member 14. The retractor 50 can be joined with the support member 14 at a distance at least 1, 2, 3, 4 or more feet from the pivot joint 33 about which the first arm 30 rotates. This configuration can be selected so that the retractor 50 and its corresponding retractor element 52 can provide a sufficient force F at an appropriate point of contact of the retractor 50 with the arm 30. With reference to FIGS. 1-3, the retractor can be located above the armature 20. The retractor 50 as illustrated includes a retractor element 52 in the form of a cord. As used herein, a cord can refer to a cable, chain, strap, rope, wire or any other elongated flexible element. Optionally, the retractor 50 and/or retractor element 52 can be in the form of a pneumatic or hydraulic shock or spring, and can provide the desired forces on the armature and spray bar to assist the human operator when they manually move the spray bar.

The retractor 50 can generally include a biasing element that is disposed internally relative to the body 53. The biasing element can urge the cord 52 to retract toward or into the retractor and into the body 53. Accordingly, the end 55 of the cord, and whatever is attached to it, is drawn toward the retractor 50. Optionally, the cord 52 can include a stop 59 attached to it to prevent the arm 30 from impacting the retractor 50.

Generally, the retractor exerts a consistent force F. This force F can be preselected to coincide with the amount of force desired to be translated to the spray bar 60 to move the armature 20 and thereby move the spray bar 60. The force F can be selected so that the spray bar 60 can be lifted in a generally vertical plane with about 1 to about 35 pounds of force being exerted by a user on the handle 62; optionally, about 2 to about 15 pounds; and further optionally about 3 to about 5 pounds of force exerted by the user on the handle 62. Of course, if the retractor 50 is not connected to the armature 20, the force required to move the spray bar 60 with the handle can be commensurate with the weight of the armature 20 and the bar 60 and any associated mechanical mechanisms.

Optionally, the retractor 50 exerts a force F sufficient to hold the armature 20 and the spray bar 60 in a retracted position as shown in FIG. 3. To operate the bar, an attendant can manually exert a downward force DF on the handle by physically engaging the handle and thus the spray bar 60 and armature 20 sufficient to overcome the upward force F exerted by the retractor. This downward force DF, can be about 1 to about 20, or optionally about 5 pounds, or any of the forces noted herein. Further optionally, the downward force to move DF can be any force sufficient to overcome the force F exerted by the retractor on the armature 20. When the retractor force F is overcome by the downward force DF manually applied by the operator, the spray bar 60 moves downward toward the vehicle and/or the pathway 100 so that the spray bar 60 is located a desired distance from the respective portion of the vehicle. The force exerted by the human user is referred to as a user force. The user force applied manually by the user can vary in magnitude and direction, depending on the user's preferred movement of the spray bar 60.

As mentioned above, the first arm 30 and a second arm 40 form a portion of the armature 20. The armature 20 generally is positioned above the pathway 100. The armature and its respective arm or arms can be movable generally within one or more vertical planes that are generally perpendicular to the pathway. Optionally, the vertical plane(s) can be located generally in the center of the pathway. The armature 20 and its arm or arms can be manually moved and/or articulated by an operator from a retracted mode (e.g., FIG. 3) to one or more extended modes (e.g., FIGS. 2, 4 and 5).

Generally speaking, the movement of the spray bar can be dictated by the human user's observation of the vehicle, the movement range of the armature, and/or the position of the vehicle. Further, the movement can be completely manual, without having input or control by a processor or computer system—particularly where the human user manually implements movement of the spray bar. Of course, the forces applied by the user for such movement can be supplemented by the armature and/or the retractor element as described herein.

The first arm 30 of the armature includes a first end 31 and a second end 32. The first end 31 is pivotally joined at a pivot joint 33 with the end 16 of the support structure 12. This first pivot 33 can include bearings or other components to enable the first arm 30 to rotate or pivot relative to the support structure 12 and/or support member 14 as desired. The first arm 30, second arm 40 and generally the armature 20 can move in one or more vertical planes. Of course, if different types of pivot mechanisms are desired and implemented, for example, ball and socket pivots, the armature and respective arms can move in a variety of planes, and can have a greater freedom of motion.

Figure 11:
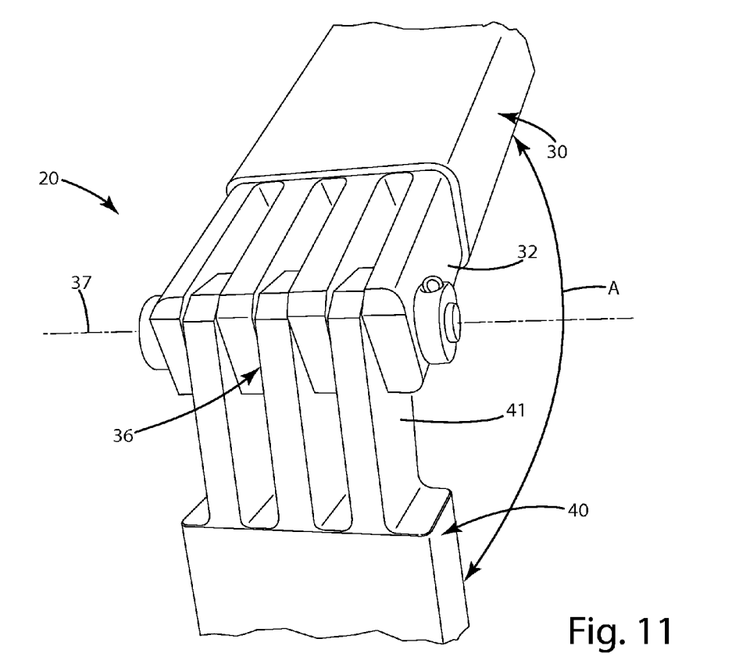
FIG. 11 is a close up view of a pivot of the armature.

The first arm 30 can terminate at a second end 32. At the second end 32 a second pivot or hinge 36 can be joined. This hinge 36 can be joined by welding, fasteners, glue or any other attachment mechanisms. An exemplary hinge 36 is illustrated in FIG. 11. The hinge 36 also can be attached to the first end 41 of the second arm 40. Accordingly, the first arm 30 and second arm 40 can move relative to one another about a pivot axis 37 defined by the hinge or second pivot 36. The second arm 40 also can include a second end 42 to which the elongated spray bar 60 is joined. At the second end 42, a swivel joint 44 can be included.

Optionally, the first 30 and second 40 arms can be configured so that the angle A between them adjacent the pivot axis 37 changes when the user applies a user force to move the spray bar 60 in one or more vertical planes, for example, the angle A can be altered optionally in a range of 0° to 360°; further optionally, in a range of about 0° to about 180°; even further optionally in a range of about 0° and 90° and/or 0° and 45°, or any other range of angles therein.

The swivel joint 44 can include bearings, guides or other components that enable the spray bar 60 to be rotated generally in a horizontal plane about an axis of rotation above the pathway 100 as described in more detail below. For example, the rotatable swivel joint 44 can include bearings that circumferentiate a portion of the bar 60 and that ride in a raceway defined by and then the end 42 of the second arm 40. In general, the spray bar can be rotatably joined with the second arm 40 so that a user can manually grasp the handle 62 and rotate the bar with their own physical strength in varying degrees and amounts about the axis 61 of the spray bar 60. In this manner, the spray nozzles can be flipped so that the liquid is sprayed in a first direction, and then in a second direction that is generally 100°-180°, or some other angle from the first direction, or some other direction at some angle between 0° and 180°. This can enable an attendant to use the same spray bar 60 to spray a front portion 101, a middle portion, and a rear portion 102 of a vehicle 103 with the same spray bar by simply rotating the bar. Of course, if desired, the swivel joint 44 can be absent depending on the application.

The spray bar 60 can include a first end 65A and a second end 65B distal from the first end 65A. Between the first and second ends is a central portion 64. Generally, the spray bar 60 is connected to the second arm 40 within the central portion 64, optionally, at the mid-point between the first 65A and second 65B ends. Of course, if desired, the point of attachment can be modified. Optionally, the connection of the central portion positions the central portion of the spray bar 60 over the pathway of the vehicle, and further optionally, in the center 100C of the vehicle pathway 100. Even further optionally, the armature 20 and arms 30, 40 of the station 10 can be positioned generally in the center of the pathway, over it and the vehicle. This can reduce the clutter of apparatus located on opposing sides of the pathway to enable ease of use and movement by the operator.

The spray bar 60 can generally be in the form of a hollow tubular member so that fluids can be conducted through it. The spray bar can also define a plurality of holes or nozzles 68 can be attached or included with the spray bar 60. Through these nozzles 68, liquid can be sprayed under pressure. This liquid can be water or chemicals, for example, pre-cleaners, degreasers, preparatory soaps or rinses, depending on the particular liquid desired to be applied at the preparation station 10. Generally, the spray nozzles can be oriented and aligned together on only one side of the spray bar 60. For example as shown in FIG. 2, the nozzles 68 can be oriented on the forward side 67 of the spray bar. The opposite side or rear side 69 of the spray bar 60 can be void of any nozzles. Accordingly, material, such as the liquid, can be sprayed from only the forward side 67 of the bar. Therefore, liquid is not wasted or sprayed in a direction toward the attendant or generally away from the vehicle 103. Of course, if desired, nozzles can be placed on the forward, rearward, or other sides of the spray bar.

The preparation station 10 also can include a hose 70 that conducts the liquid to the spray bar 60. This hose can be a conventional hose of any sufficient dimension, and can be constructed from materials such as rubber, nylon, polymeric, composite or other tubing sufficient to convey the desired chemicals or water to the spray bar. The hose can generally extend upwardly along or in a portion of the support structure 12. The hose can further extend along the first arm 30 and the second arm 40. The hose can be connected directly to the elements by suitable fasteners, for example, tie downs, zip ties or brackets depending on the application. Optionally, the hose can be configured and attached to it does not undergo unnecessary wear or excessive bending or kinking that may impair the flow of the liquid to the spray bar 60.

The distal end 72 of the hose can be connected to the spray bar 60 via a swivel fitting 73. The swivel fitting 73 can be configured to swivel and turn so that when the spray bar 60 is rotated about axis of rotation 61, the end of the hose does not twist and/or kink. Of course, in certain applications, the hose can be configured differently so that it is ported directly into the spray bar 60 without swivel fitting 73. Alternatively, the hose can be attached to an end 65A, 65B of the spray bar 60 without extending along all of the different components. In such a construction, however, the hose 70 may interfere with movement of the armature, the spray bar 60 or get in the way of the attendant and/or the vehicle.

The hose can be in fluid communication with a high pressure pumping station that pumps water and/or chemicals into it. If desired, the hose can be replaced with a specialized line that can expel steam from the spray bar.

Optionally, the spray bar can be supported substantially only in the central portion 64 of the spray bar. In this manner, space is conserved and the weight of the armature plus the spray bar is significantly reduced. Accordingly, the spray bar can be moved more easily. Further, the size the retractor 50 and the force F generated by the biasing element to assist in moving the armature 20 can be reduced, which can reduce the overall size and cost of the equipment for the station 10.

Further optionally, the arm 40 can be mounted slightly off center a preselected distance, for example, 1, 2, 3, 4, 5, 6, 7, 8, 9, 10, 11, 12, 16, 24 or more inches from the exact middle of the spray bar, for example, toward the driver side of the vehicle 103. This driver side offset mounting can increase the reaction time of the attendant's motions and channel the motions directly to the arm. It also can offset any additional weight of the handle grip 62.

To an end of the spray bar 60, or in some other easily accessible location on the spray bar, a handle 62 is attached. This handle is manually graspable by a user so that the user can manipulate and move the spray bar in one or more desired directions while spraying liquid from the spray bar 50 on to a vehicle located on the pathway 100. If desired, the spray bar 60 can be outfitted with handles on opposite ends (not shown) of the spray bar 60.

Optionally, adjacent and/or on the handle, a control 62A can be located. This control can be in the form of a trigger or a button that enables an attendant to selectively initiate and/or stop spray of liquid from the spray bar 60. Further optionally, the handle or control 62A can include a wireless human interface, or panel of selector buttons. The interface can wirelessly communicate with a controller that controls the materials pumped into the hose, the on/off function of the spray bar, the water pump pumping the materials, a chemical injection system, a steam system associated with the bar, and/or a roller on a conveyor in the pathway that can push the vehicle at a preselected time. The attendant can press the selector buttons depending on the desired function.

III. Operation and Use

A method of using the preparation station 10 of the car wash system herein will now be described with reference to FIGS. 1-11. As shown in FIGS. 1 and 2, the preparation station 10 is configured to spray a vehicle 103 with preparatory chemicals and/or water before it enters an automated car wash station 107 where it is further treated with more materials via the primary washing apparatus 109. In this configuration, an attendant can manually grasp the handle 62 and draw the spray bar 60 toward the front portion of the vehicle 101.

The attendant can manually pull the armature 20 downward into an extended position as shown in FIG. 2. As the user pulls the armature 20 downward, the retractor 50 gradually lets out the cord 52 (or where the retractor is a pneumatic shock, retracts and/or extends) so that the armature 20 can be moved with a small force, generally between about 5 and 15 pounds, or other forces described herein. The retractor 50 also holds the armature 20 so that it does not fully extend or drop under the force of gravity. The attendant can manipulate the handle 62 so that the spray nozzles 68 are facing the front region 101 of the vehicle 103 on the pathway 100. Generally, the spray bar is parallel to the surface of the pathway 100. The attendant can move the spray bar toward the vehicle a desired extent to provide and actuate the spray bar 60 so that it sprays the liquid on the desired frontal region 101 of the vehicle 103.

After enough liquid has been sprayed on the frontal region 101 of the vehicle and/or the vehicle 103 begins to travel forward on the pathway 100 through the preparation station 10 toward the car wash station 107, the attendant can exert an upward manual force on the handle 62 which in turn moves the armature upward 20 as well. The retractor 50, exerting the force F, assists the user in this upward movement of the armature 20. Accordingly, the physical, manual force required of the attendant to move the armature upward can be reduced substantially, generally requiring only about 2 to 10 pounds to vertically move the spray bar 60 up and out of the way of the vehicle 103 as it travels on the pathway 100.

Figure 9:
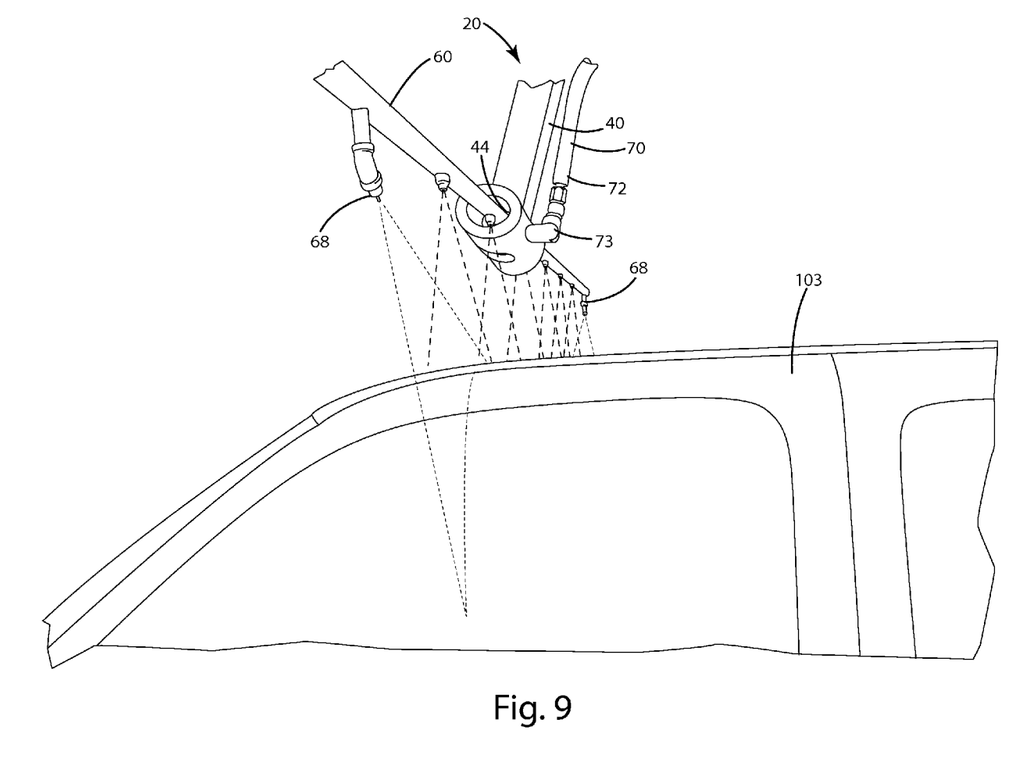
FIG. 9 is a close up view of the preparation station with the spray bar partially swiveled to spray in a second direction toward a middle region of the vehicle.
Figure 10:
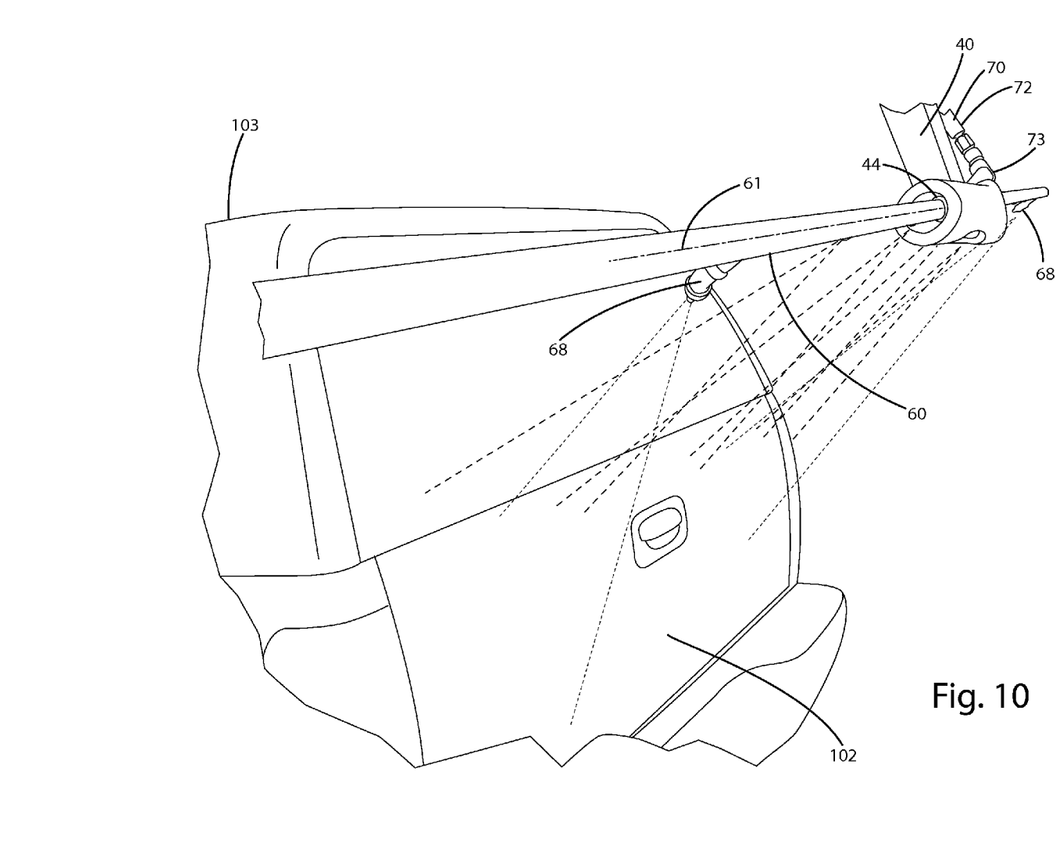
FIG. 10 is a close up view of the preparation station with the spray bar swiveled further about the axis of rotation to spray in a third direction toward a rear portion of the vehicle.

After the attendant raises the bar a sufficient distance, the attendant can stop applying the manual force. The retractor 50, with its force F exerted on the armature 20, thereby holds the armature 20 in the static position generally shown in FIG. 3. As the support bar and armature is held in the position shown in FIG. 3, the vehicle 103 travels forwardly along the pathway 100. During this time, the attendant need not exert any additional force on the armature, as the retractor 50 suspends the armature 20 above the vehicle 103. Additionally, during this time, the attendant can operate the handle 62, rotate the bar about axis 61, and to aim the nozzles 68 downward in another direction at the middle portion of the vehicle passing under the spray bar. The attendant can actuate the nozzles and apply liquid to the vehicle (FIG. 9).

As or after the vehicle passes through the preparation station 10, the attendant can grasp the handle 62 and manually rotate the support bar 60 about the axis 61 to change the direction of the spray nozzle 68. For example, the car has passed a sufficient distance, the attendant can orient the spray bar to spray the rearward portion 102 of the vehicle, or shown in FIGS. 4 and 10.

Returning to FIG. 4, after the spray bar 60 has sprayed sufficient liquid on the rearward region 102 of the vehicle 103 and/or the vehicle 103 is passed the preparation station 10, the attendant can again raise the spray bar 60, above the pathway 100 a sufficient distance so that the spray bar 60 is out of the way of vehicles 103 being moved or moving on the pathway 100. Again, the retractor 50 can provide the sufficient force F to completely withdraw the armature 20 and spray bar 60 from that path if desired.

Optionally, the armature 20 and spray bar 60 can be moveable toward, or can chase and catch-up with a vehicle, to spray additional materials on the vehicle, particularly on excessively dirty regions. For example, the armature can be moved in a pendulum-like motion, where the spray bar first travels forward toward the front region 101 of the vehicle, then the bar 60 moves with the vehicle 103 (backwards, toward station 107), for a few feet, then up and over the vehicle, then catches up with and/or chases with the rearward region 102 of the vehicle for a preselected amount of time or movement. With this movable armature and bar, the station can apply more materials to a particularly dirty area, for example, the rear fenders and/or rear of the vehicle.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A car wash apparatus comprising:
    a pathway along which a vehicle travels;
    a support structure positioned adjacent the pathway;
    a support member fixedly joined with the support structure and extending from the support structure;
    a retractor element joined with the support member, the retractor element including a body and a cord that is extendable from a retracted configuration to an extended configuration, the body including a biasing element, the cord including a first end that is moveable toward and away from the body of the retractor element;
    a first arm having a first end connected by a first pivot joint to at least one of the support structure and the support member and a second end opposite the first end, the first arm joined with the first end of the cord, the first arm configured to pivot relative to at least one of the support structure and the support member at the first pivot joint;
    a second arm having a first end and a second end, the first end of the second arm connected to the second end of the first arm by a second pivot joint defining a pivot axis, such that the second arm can pivot relative to the first arm at the second pivot joint about the pivot axis;
    an elongated spray bar including a first end, a second end and a central portion located between the first and second ends, the elongated spray bar rotatably mounted to the second end of the second arm at a location in the central portion such that the spray bar is rotatable in a horizontal plane about an axis of rotation above the pathway, the elongated spray bar including a plurality of nozzles oriented and aligned on at least a first side of the spray bar and along an axis from the first end to the second end thereof, the plurality of nozzles adapted to spray outward away from the axis to spray a liquid on a vehicle located on the pathway;
    a hose joined with the elongated spray bar and adapted to deliver a liquid to the plurality of nozzles; and
    a handle joined with the elongated spray bar adjacent the first end,
    wherein the handle is manually graspable by a user,
    wherein the handle is configured to enable a user to manually move the spray bar over the pathway, toward and away from a vehicle located on the pathway, and to rotate the spray bar about the axis of rotation to selectively spray the vehicle with the liquid,
    wherein the retractor assists the user in manually moving the elongated spray bar at least in a vertical direction,
    wherein the first arm and second arm are configured to pivot relative to one another about the pivot axis of the second pivot joint through a range of angles generally within at least one vertical plane.

2. The apparatus of claim 1 wherein the hose is joined with the spray bar at a swivel fitting.

3. The apparatus of claim 2 wherein the hose extends adjacent the second arm, the first arm and the support structure.

4. The apparatus of claim 1 wherein the elongated spray bar is supported in the central portion by the second arm, and wherein the central portion is located in a center of the pathway along which the vehicle travels.

5. The apparatus of claim 1 wherein the handle includes a control that is manually engagable by a user as the user grasps the handle to move the spray bar, wherein the control is in communication with a controller that controls material sprayed from the spray bar.

6. The apparatus of claim 1 wherein the support member is substantially stationary relative to the support structure, wherein the first arm and second arm are moveable through a range of motion as the car passes under the support member.

7. The apparatus of claim 1 wherein the first arm and second arm each are in the form of elongated bars that extend generally downwardly, below the support member, in at least one vertical plane, wherein the first and second arms pivot toward and away from one another as the spray bar is moved in the at least one vertical plane.

8. The apparatus of claim 1 wherein the first arm is pivotally joined with the second arm such that the first and second arms move at an angle relative to each other within a range of 0 to 360 degrees.

9. The apparatus of claim 1 wherein the support member is disposed at an angle of about 60 degrees to about 45 degrees from horizontal.

10. A car wash apparatus comprising:
    a pathway along which a vehicle travels;
    a support structure positioned adjacent the pathway;
    a support member joined with and extending from the support structure;
    a retractor element joined with the support member, the retractor element including a body and a cord that is extendable from a retracted configuration to an extended configuration, the body including a biasing element, the cord including a first end that is moveable toward and away from the body of the retractor element;
    a first arm pivotally joined with at least one of the support structure and the support member at a first pivot, the first arm joined with the first end of the cord, the first arm configured to pivot relative to at least one of the first pivot and the support member;
    a second arm pivotally joined with the first arm at a second pivot;
    an elongated spray bar including a first end, a second end and a central portion located between the first and second ends, the elongated spray bar rotatably joined with the second arm distal from the second pivot at a location in the central portion such that the spray bar is rotatable in a horizontal plane about an axis of rotation above the pathway, the axis of rotation fixed perpendicular to the pathway, the elongated spray bar including a plurality of nozzles adapted to spray a liquid on a vehicle located on the pathway;
    a hose joined with the elongated spray bar and adapted to deliver a liquid to the plurality of nozzles; and
    a handle joined with the elongated spray bar adjacent the first end,
    wherein the handle is manually graspable by a user,
    wherein the handle is configured to enable a user to manually move the spray bar over the pathway, toward and away from a vehicle located on the pathway, and to rotate the spray bar about the axis of rotation to selectively spray a front, a center, and a rear of the vehicle with the liquid,
    wherein the retractor assists the user in manually moving the elongated spray bar at least in a vertical direction, wherein the first arm and the second arm are movable primarily in a first vertical plane centered over the pathway, wherein the first arm and the second arm are configured to pivot relative to one another about the pivot point through a range of angles within the first vertical plane.

11. An automatic car wash system comprising:
a pathway along which a vehicle travels;
a car wash preparation station comprising:
  a support structure positioned adjacent the pathway;
  a support member joined with and extending from the support structure;
  a retractor element joined with the support member, the retractor element including a body and a cord that is extendable from a retracted configuration to an extended configuration, the body including a biasing element, the cord including a first end that is moveable toward and away from the body of the retractor element;
  a first arm having a first end connected by a first pivot joint to at least one of the support structure and the support member and a second end opposite the first, the first arm joined with the first end of the cord, the first arm configured to pivot relative to at least one of the support structure and the support member at the first pivot joint;
  a second arm having a first end and a second end, the first end of the second arm connected to the second end of the first arm by a second pivot joint defining a pivot axis, such that the second arm can pivot relative to the first arm at the second pivot joint about the pivot axis;
  an elongated spray bar including a first end, a second end and a central portion located between the first and second ends, the elongated spray bar joined with the second end of the second arm distal from the second pivot joint at a location in the central portion, the elongated spray bar including a plurality of nozzles adapted to spray a liquid on a vehicle located on the pathway;
  a hose joined with the elongated spray bar and adapted to deliver a liquid to the plurality of nozzles; and
  a handle joined with the elongated spray bar adjacent the first end,
  wherein the handle is manually graspable by a user,
  wherein the handle is configured to enable a user to manually move the spray bar over the pathway, toward and away from a vehicle located on the pathway, to selectively spray the vehicle with the liquid,
  wherein the retractor assists the user in manually moving the elongated spray bar at least in a vertical direction,
  wherein the first arm and second arm are configured to pivot relative to one another about the pivot point through a range of angles generally within at least one vertical plane, and
  wherein the support member, first arm, and second arm are aligned with a center line of the pathway such that at least the first arm is movable upward and downward in a vertical plane centered along the center line of the pathway to move the spray bar within a vertical plane while the spray bar remains horizontal relative to the pathway, and
an automated car wash station disposed along the pathway, subsequent to the car wash preparation station, to wash the car in a primary washing operation,
wherein the vehicle traveling along the pathway passes through the car wash preparation station for pre-treatment prior to entering the automated car wash station for the primary washing operation.

* * * * *